(No Model.)
W. P. PHILLIPS.
RELIEF VALVE.
No. 492,168. Patented Feb. 21, 1893.
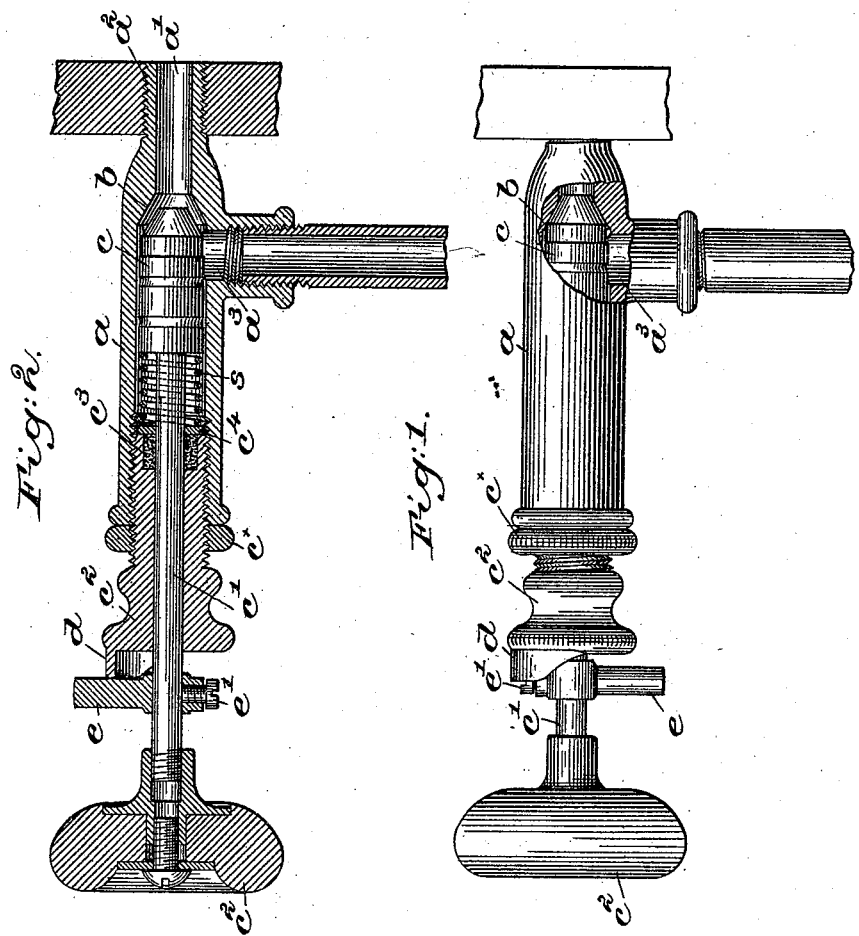
Witnesses
Fred S. Greenleaf.
Louis N. Towell
Inventor:
William P. Phillips.
by Crosby & Gregory
Attys.
THE NORRIS PETERS CO., PHOTO-LITHO., WASHINGTON, D. C.

UNITED STATES PATENT OFFICE.

WILLIAM P. PHILLIPS, OF SOMERVILLE, MASSACHUSETTS.

RELIEF-VALVE.

SPECIFICATION forming part of Letters Patent No. 492,168, dated February 21, 1893.

Application filed June 6, 1892. Serial No. 435,619. (No model.)

*To all whom it may concern:*

Be it known that I, WILLIAM P. PHILLIPS, of Somerville, county of Middlesex, State of Massachusetts, have invented an Improvement in a Combined Blow-Off and Relief-Valve, of which the following description, in connection with the accompanying drawings, is a specification, like letters on the drawings representing like parts.

This invention has for its object to provide an improved valve, which may be positively opened to serve as a blow-off valve, or which may be used as a relief valve to open automatically to relieve a pressure when the latter becomes excessive, the change in the valve to adapt it for either purpose being readily effected.

Figure 1, represents in elevation a valve embodying this invention; and Fig. 2, a longitudinal section of the same.

Referring to the drawings, the valve case $a$, is of suitable shape and construction to contain the various parts, it having a suitable inlet $a'$ within the threaded end $a^2$, and an outlet $a^3$. In practice, the threaded end $a^2$ is screwed into or otherwise connected with a boiler, cylinder, or other device which is to be drained or relieved, and the outlet $a^3$ may be connected with a suitable discharge pipe as shown.

The valve case $a$, contains a suitable valve seat $b$ upon which is normally seated a valve $c$, the latter when seated as in Fig. 1, closing the inlet $a'$; but when the said valve is raised from its seat, as shown in Fig. 2, communication is established between the inlet $a'$ and discharge opening $a^3$.

The valve $c$ in the present construction is fixedly attached to the spindle $c'$ which is extended out through a plug $c^2$ tapped into the end of the valve case as shown, the said spindle at its outer end being provided with a suitable handle or device $c^{2\times}$ by means of which the spindle and its attached valve may be moved. The end of the plug $c^2$ within the case $a$, is counterbored or chambered as at $c^3$ to receive a suitable packing, as shown, the same being compressed about the spindle by a washer $c^4$ between which and the head of the valve $c$ is interposed a spiral spring $s$, the spring acting upon the washer to press the packing tightly about the spindle, and also to move the valve to and retain it upon its seat $b$. A lock nut $c^\times$ serves to retain the plug $c^2$ in adjusted position with relation to the valve case, the said plug $c^2$ having a semi-circular annular cam surface or flange $d$ about its periphery as shown.

An arm $e$ is adjustably fixed to the spindle $e'$ by means of a screw $e^2$, passed through the hub of the arm the said arm when the spindle is rotated, riding upon the flange $d$ to thus draw the spindle out from the valve case to lift the valve $c$ from its seat. When the valve stem is turned so that the arm $e$ is upon the side of the plug opposite the cam flange $d$, the hub of the arm, together with the screw $e^2$ by which it is adjustably secured to the valve stem, move freely within the annular cam flange, as shown in Fig. 2.

The valve $c$ is normally seated by the spring $s$, but when the pressure in front of the valve overbalances the spring, the valve will be lifted from its seat to relieve the pressure, the valve being returned to its seat as soon as the pressure is reduced.

The valve may be opened for the purpose of blowing off water or steam, by partial rotation of the spindle $c'$ by means of the handle $c^2$, such partial rotation causing the arm $e$ to ride upon the flange $d$ and thereby move the spindle longitudinally to lift the valve from its seat. The valve will remain open so long as the spindle is held by the arm resting on the flat top of the flange $d$, opposite rotation of the spindle moving the arm $e$ off the cam flange to permit the spring $s$ to seat the valve.

The plug $c^2$ may be adjusted to vary the tension of the spring $s$ and the pressure at which the valve will automatically open, and the tension of the spring may be increased to such a degree that the valve will not open automatically but only when positively lifted from its seat by rotation of the spindle.

The arm $e$ is adjusted on the spindle to its proper position whenever the plug $e^2$ is adjusted and the distance through which the valve is raised by rotation of the arm onto the cam will also be varied to thereby vary the area of the valve opening by adjustment of the arm longitudinally upon the valve stem.

The packing in the chamber $c^3$ prevents leakage about the spindle, and the lock nut $c^x$ prevents leakage around the plug.

The edge of the nut $c^x$ and the portion $c^5$ of the plug are preferably milled or roughened so that they may be easily and firmly grasped and turned for adjustment.

I claim—

1. A valve case containing a valve seat, and a valve therefor provided with a spindle, combined with a plug in one end of the valve case and through which said spindle passes, a spring to seat the valve, a cam flange on the plug, and an arm adjustable longitudinally on the valve stem, partial rotation of the valve stem and arm acting to move the arm onto the cam surface of the flange to thereby lift the valve from its seat against the action of the spring, the distance through which the valve is lifted being varied by longitudinal adjustment of the arm on the valve stem, substantially as described.

2. A valve case containing a valve seat, and a valve therefor provided with a spindle, combined with a plug in one end of the valve case and through which the said spindle passes, a spring to seat the valve, an annular cam flange having a flat top, formed on the plug, and an arm extended laterally from the valve stem, rotation of the valve stem and arm causing the latter to ride up the inclined cam surface to the flat top thereof, to lift the valve from its seat, the flat top of the cam flange acting alone to retain the valve in its unseated position, substantially as described.

3. A valve case containing a valve seat, and a valve therefor provided with a spindle, combined with a plug in one end of the valve case and through which the said spindle passes, a spring to seat the valve, an annular cam flange on the plug, an arm on the valve stem, a screw to retain the same in adjusted position, rotation of the valve stem causing the arm to ride up on the cam surface to lift the valve from its seat, the hub of the arm and the adjusting screw moving within the flange when the arm is turned toward the side of the plug opposite the cam flange, substantially as described.

In testimony whereof I have signed my name to this specification in the presence of two subscribing witnesses.

WILLIAM P. PHILLIPS.

Witnesses:
FREDERICK L. EMERY,
EMMA J. BENNETT.